Oct. 2, 1934.  E. O. RHODES  1,975,433
PROCESS AND APPARATUS FOR MELTING MATERIALS
Filed March 23, 1932   2 Sheets-Sheet 2

INVENTOR.
Edmund O. Rhodes.
BY
Jesse R. Langley
ATTORNEY.

Patented Oct. 2, 1934

1,975,433

UNITED STATES PATENT OFFICE 1,975,433

PROCESS AND APPARATUS FOR MELTING MATERIALS

Edmund O. Rhodes, Pittsburgh, Pa., assignor to American Tar Products Company, Inc., a corporation of Delaware Application March 23, 1932, Serial No. 600,777

10 Claims. (Cl. 126—343.5)

This invention relates to method and apparatus for melting materials, more particularly bituminous materials, such as pitches and asphalts.

It is frequently desirable to melt large quantities of such materials at a fairly rapid rate. It has been practically impossible to accomplish this efficiently on a commercial scale, with pans, kettles, stills, or the like. When pitch, for instance, is melted in such vessels, some of the material deposits on the bottom, to which the heat is applied, and forms an insulating layer.

This makes necessary the use of more heat with the result that hot spots may develop and cause deterioration of the vessel. After an initial quantity of pitch is melted, it is necessary for the heat to penetrate through a considerable layer of liquid pitch in order to melt the solid pitch. Liquid pitch is a comparatively poor heat conductor and poor heating efficiency results.

Furthermore, particles of solid pitch floating in molten pitch tend to fuse or stick together to form large islands or masses that present a surface area to the melting action of the liquid pitch very much smaller than the surface area of original pitch particles. This results in further lack of efficiency.

It is therefore an object of the present invention to provide method and apparatus for melting materials rapidly and efficiently without causing decomposition or appreciable vaporization of the materials being melted.

The invention is suitable for the melting of a large number of materials. Various organic, plastic, solid or semisolid materials, including bituminous materials, such as pitch or asphalt may be advantageously melted in the manner to be described.

The application to various high melting point pitches is particularly important, the melting point of such pitches being above about 100° C. The process may, however, also be applied to relatively low melting point pitches having melting points below 100° C. For example, a pitch commonly used for fuel purposes has a melting point of about 150° C. and is particularly difficult to melt rapidly and efficiently without decomposition, in kettles, pans, stills or the like, whereas, by the present process the liquefaction of this material is very satisfactorily accomplished.

According to the present invention, the material to be melted is contacted with a heated liquid which is chemically inert with respect to the material to be melted. The heated liquid and the material to be melted are preferably insoluble in each other. The contacting is preferably a surface contact between the material to be melted and a bath of liquid of greater density than the material to be melted, which bath is maintained at such a temperature as to cause melting of the material without substantial decomposition or vaporization thereof. It is known that a change in melting point does not occur when the chemical composition of a material remains substantially unchanged.

While lead, tin, zinc, or various alloys are suitable for this purpose, a bath of molten lead is preferred. For certain purposes, liquids other than molten metals may be preferable. The liquids which may be used are those having sufficient density to float the material to be melted, sufficient heat resistance, and which do not dissolve in or combine with the material to be melted.

Another object is to accomplish this melting continuously and/or at a fairly rapid rate.

Further objects are to improve and facilitate the melting of materials of this character and to render the method and apparatus more satisfactory for the purposes set forth.

Other objects and features of novelty will be apparent as the following description proceeds, reference being had to the accompanying drawings, in which Figure 1 is a diagrammatic elevation, partly in section, showing a preferred embodiment of the apparatus phase of the invention, and by means of which the process phase of the invention may be carried out.

Figure 1:
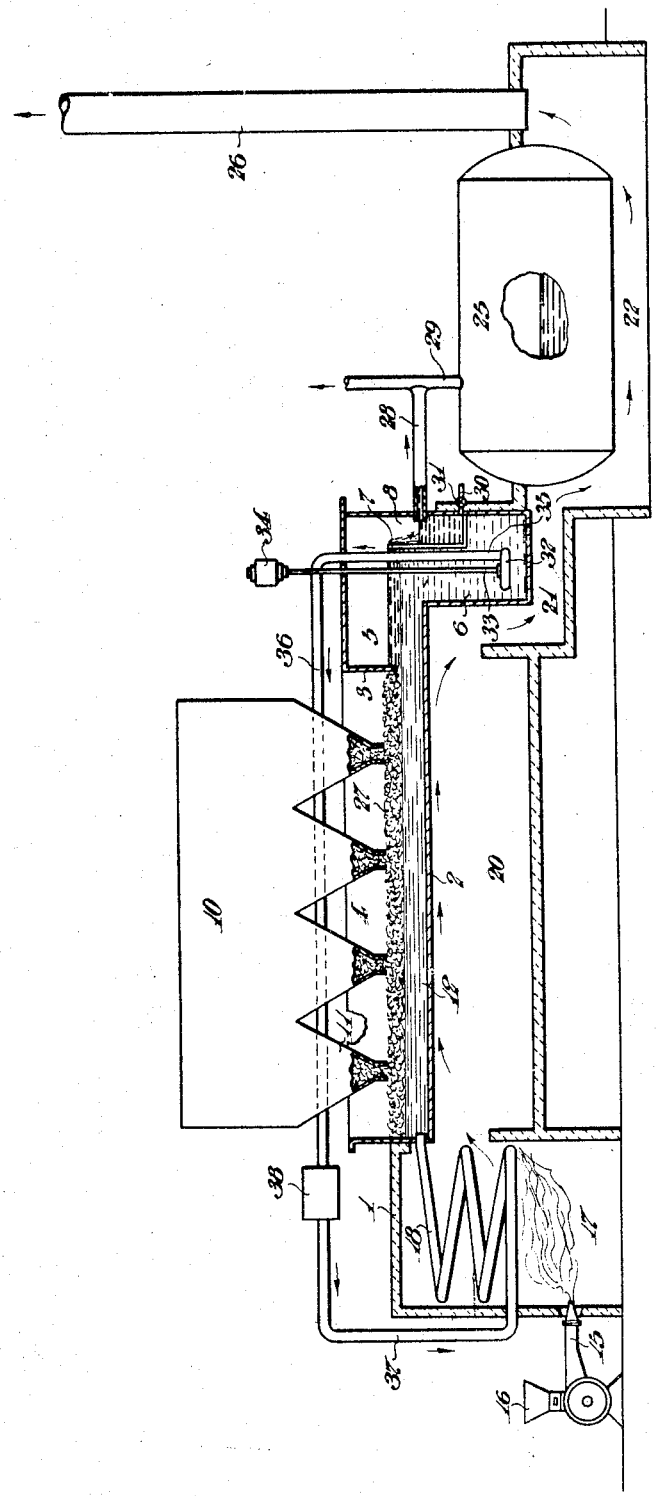
Figure 2:
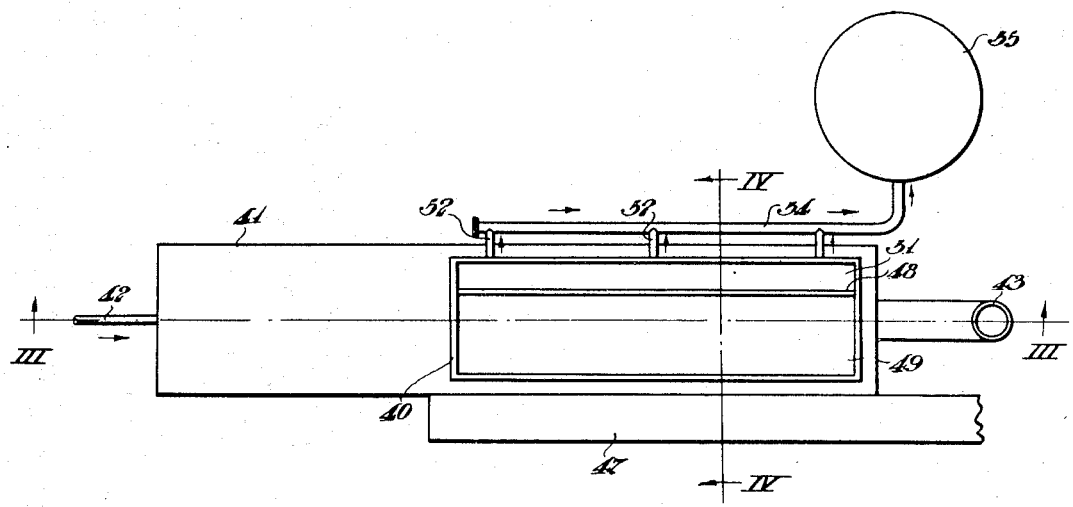
Fig. 2 is a plan view of a simplified form of apparatus adapted to be used in the process.
Figure 3:
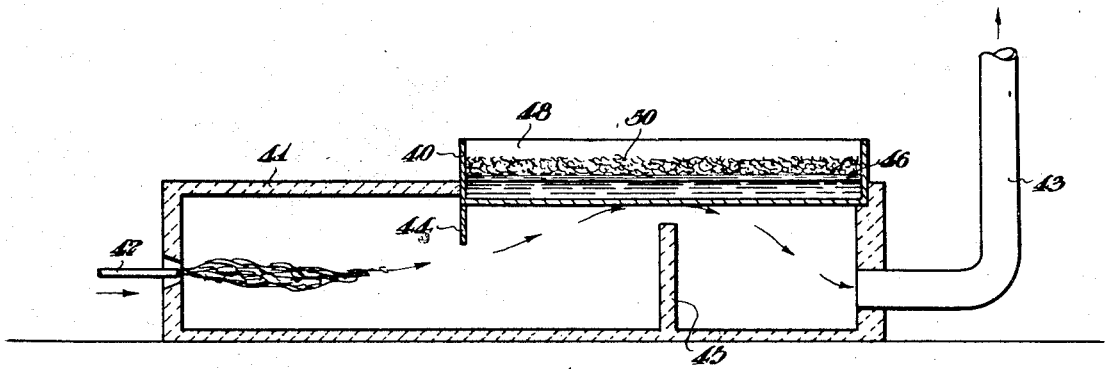
Fig. 3 is a sectional view, taken on line III—III of Fig. 2.
Figure 4:
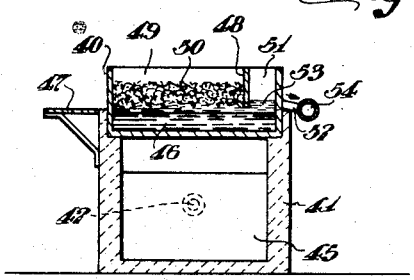
Fig. 4 is a cross-sectional view of the apparatus shown in Fig. 2, taken on line IV—IV.

The liquid of the bath may be maintained quiescent as in the apparatus shown in Figs. 2 to 4, or the same may be circulated through the baths as in the apparatus shown in Fig. 1. The unmelted material is retained in contact with one portion of the bath, and the molten material, while floating on the bath, flows under a dam, to a separating chamber from which the melted material is withdrawn continuously or as desired.

Referring more particularly to the drawings, the apparatus comprises a furnace setting 1 in which is mounted a melting chamber 2 adapted to contain a bath of heated liquid by means of which the melting is accomplished. The chamber 2 may or may not be covered to prevent loss of fumes or to prevent contamination. This chamber is provided with a partition 3 which functions as an inverted dam or weir and divides the chamber 2 into a melting zone 4 and a separating zone 5.

The separating zone 5 is provided with a sump 6 for the liquid of the bath. A partition 7 functions as an overflow dam or weir, and separates an overflow chamber 8 from the remaining portion of the separating chamber 5.

The material to be melted, such as lump or crushed pitch, is supplied by a bin 10 having a plurality of hoppers 11 which discharge the pitch into the chamber 2 onto the surface of the bath of heated liquid 12 therein. The heat for the process is supplied by a burner 15 having a hopper 16 to which is supplied solid fuel. Of course, liquid or gaseous fuel may be supplied to the burner 15, or a bed of solid fuel may be employed in lieu thereof.

The fuel is burned in a combustion chamber 17 in which is mounted a coil 18. Gaseous products of combustion pass from the combustion chamber 17 around the coil 18 and through a passage 20 adjacent the chamber 2 so as to heat the same. From the chamber 20 the gases of combustion pass through a passage 21 adjacent the sump 6 into a chamber 22 which serves to heat a receiving or storage tank 25 for the melted material. From the chamber 22 the spent gases of combustion are exhausted to a stack 26.

The liquid of the bath, such as molten lead heated in the coil 18, is discharged into the chamber 2 and supplies the liquid for the bath 12. The solid pitch 27 discharged by the hoppers 11 forms a layer over the surface of the bath 12. The particles at the bottom of this layer, being in contact with the upper surface of the bath 12, are rapidly melted and the melted pitch forms a thin layer between the bath 12 and the solid material 27. The melted pitch flows under the inverted dam or weir 3 into the separating chamber 5. The unmelted material is retained by the member 3.

In the separating chamber 5, the melted pitch overflows the partition 7 into the overflow chamber 8, from which the liquid of the bath is excluded by the partition 7. The separated melted material is withdrawn from the chamber 8 by a pipe 28 connected to the receiving tank 25 by means of a pipe 29. The upper end of this pipe 29 forms a vent for the escape of gases liberated during the melting process.

The chamber 8 may be made of such depth that it may serve as a trap for any liquid from the bath which may accidentally flow over the dam 7. The pipe 28 is positioned well above the bottom of the trap, and any heating liquid which settles therein may be withdrawn from time to time through a pipe 30 having a valve 31. The material collecting in the trap is kept heated by the surrounding liquid in the sump 6.

A pump 32 is mounted in the lower portion of the sump 6 and is driven by a shaft 33 extending from a motor 34. The pump 32 forces the liquid of the bath through pipes 35, 36 and 37 to the coil 18 and thus maintains the cyclic circulation of the liquid of the bath. A strainer 38 is preferably interposed in the line 36 in order to retain any foreign solid particles which might cause trouble in the coil 18.

Of course, the pump 32, the coil 18 and the piping therebetween may be omitted, in which case the liquid 12 in the chamber 2 would form a quiescent bath heated entirely by the products of combustion passing through the chamber 20. Furthermore, instead of being charged and operated continuously, the material to be melted may be charged in batches by the hoppers 11 and may be withdrawn in batches through the pipe 28.

The apparatus shown in Figs. 2 to 4 comprises a pan 40 and means for heating the same. In the drawings the pan is shown mounted in a furnace setting 41. A burner 42 is provided at one end of the setting and a stack 43 at the other. Suitable baffles 44 and 45 deflect the hot gases toward the bottom of the pan.

The pan 40, which is preferably oblong in shape, contains a layer of molten material 46 such as molten lead or the like. Along one side of the pan 40, is a runway 47 for conveying solid bituminous material to be dumped into the pan. Any form of conveyor may be employed for continuously or intermittently dropping the material to be melted onto the heating liquid.

Extending from one end of the pan 40 to the other, and spaced from the sides thereof, is an inverted weir member 48, the lower edge of which does not quite touch the surface of the molten metal 46. The weir divides the pan into a melting compartment 49 into which the solid bituminous material 50 is dumped, and a compartment 51 into which the melted material passes beneath the weir 48.

Any number of pipes 52 may be connected to the compartment 51 for withdrawing the melted bituminous material 53. The entrances of these pipes 52 are placed above the level of the molten metal 46. The pipes 52 conduct the melted material 53 to the pipe 54 by which it is conducted to a storage tank 55.

It will be seen that by causing the melted bituminous material to flow out of an oblong pan in the direction of its shorter dimension, the time of contact between the melted material and the molten metal may be considerably less than in the case where the material is withdrawn from an end of the pan in the direction of its larger dimension. In the former case the capacity of the melter may be considerably greater than in the latter case.

The capacity of a melter may be varied by varying the height to which a pan is loaded or the height to which the hoppers 11 in Fig. 1 are filled with solid bituminous material. The solid bituminous material is depressed into the bath of molten metal and the particles of material become surrounded by the metal. The greater the height of solid material the further the material is depressed into the bath of molten metal and the greater are the number of particles which are contacted with and surrounded by the metal. From this it follows that the greater the height of solid bituminous material the greater will be the rate of melting.

Because of the favorable conditions for heat transfer, the rate of melting is rapid, and in view of the comparatively low temperature of the molten metal bath, together with the short time of contact between the melted material and the bath, the danger of coking is avoided.

While certain embodiments of the invention have been illustrated and described in such detail as to enable anyone skilled in the art to practice the invention, nevertheless it will be understood that the invention is not to be limited to any of the details disclosed, other than as necessitated by the development of the prior art. Instead it will be appreciated that the invention embraces such embodiments of the broad idea as fall within the scope of the appended claims.

I claim as my invention:

1. Apparatus for melting a bituminous material comprising in combination, means for contacting said bituminous material with molten material chemically inert with respect to said bituminous material, and means for maintaining said molten inert material at a temperature above the melting point of said bituminous material, means for withdrawing the melted bituminous material, and means for maintaining solid, unmelted portions of the bituminous material in contact with the said molten inert material.

2. Apparatus for melting an organic material comprising in combination, a bath of molten material chemically inert with respect to said organic material and at a temperature higher than the melting point of said organic material, means for passing said organic material onto said bath, means for withdrawing melted organic material, and means for maintaining solid, unmelted portions of the organic material in contact with the bath.

3. The method of melting bituminous material which comprises contacting bituminous material with molten material chemically inert with respect to said bituminous material and at a temperature higher than the melting point of said bituminous material, and floating off the melted bituminous material while retaining the unmelted bituminous material.

4. Apparatus for melting a bituminous material, comprising in combination, a heating furnace, a chamber adapted to contain a bath of molten inert material, means for discharging the solid bituminous material onto said bath, means for heating and circulating the molten inert material, means for withdrawing melted bituminous material, and means for maintaining solid unmelted portions of the bituminous material in contact with the said molten inert material.

5. Apparatus for melting bituminous material comprising in combination, a bath of molten material chemically inert with respect to said bituminous material, means for maintaining said bath at a temperature above the melting point of said bituminous material, means for charging solid bituminous material onto said bath, a partition above said bath having a lower edge at a height adapted to retain unmelted bituminous material but permit melted bituminous material to flow therebelow while floating on said molten inert material, and means for withdrawing said melted bituminous material which has passed under said partition.

6. The method of melting a bituminous material, which comprises passing molten material chemically inert with respect to said bituminous material and having a higher specific gravity through a heating zone wherein the chemically inert material is heated to a temperature above the melting point of said bituminous material but below the temperature of decomposition thereof, passing the heated chemically inert material from said heating zone to an enlarged melting zone, wherein a bath of said molten inert material is maintained, discharging the solid bituminous material onto the surface of said bath of molten inert material, whereby particles of bituminous material in contact with said bath are melted, floating off the melted bituminous material and passing the same to a separating zone while retaining unmelted bituminous material in said melting zone, separately taking off the melted bituminous material and returning the molten inert material to said heating zone, and maintaining a cyclic circulation of said molten inert material through said heating, melting and separating zones.

7. A process of melting bituminous materials, which process comprises placing solid bituminous material on the surface of a body of molten lead, melting the bituminous material and withdrawing it in a liquid state as rapidly as it forms from a region between the solid bituminous material and the surface of the molten lead while maintaining a layer of the solid bituminous material floating on the said body of molten lead.

8. A process of melting bituminous materials, which process comprises maintaining a layer of solid bituminous material floating on the surface of a body of molten inert material sufficiently hot to melt the said solid bituminous material, withdrawing melted bituminous material in a liquid state from a region between the layer of solid bituminous material and the said body of molten inert material, and depressing solid bituminous material below the surface of the said body to increase the rate of production of liquefied bituminous matter.

9. A process of melting bituminous materials, which process comprises maintaining floating masses of solid bituminous material on a body of molten inert material which is sufficiently hot to melt the said solid bituminous material, withdrawing melted bituminous material from the surface of the said body of molten inert material, and varying the rate of production of liquefied bituminous matter by varying the amount of solid bituminous material that is depressed below the surface of the said body of molten inert material.

10. A method of melting organic matter, which method comprises contacting the organic matter with molten material chemically inert with respect to said organic matter and at a temperature higher than the melting point of said organic matter, and withdrawing the melted organic matter from the surface of the said molten material substantially as rapidly as it forms and before any substantial chemical change or vaporization of the said organic matter occurs, thereby preventing a change in the melting point of said organic matter.

EDMUND O. RHODES.